Feb. 3, 1925.
L. C. HILL
MOTOR VEHICLE
Filed Sept. 5, 1918
1,524,710
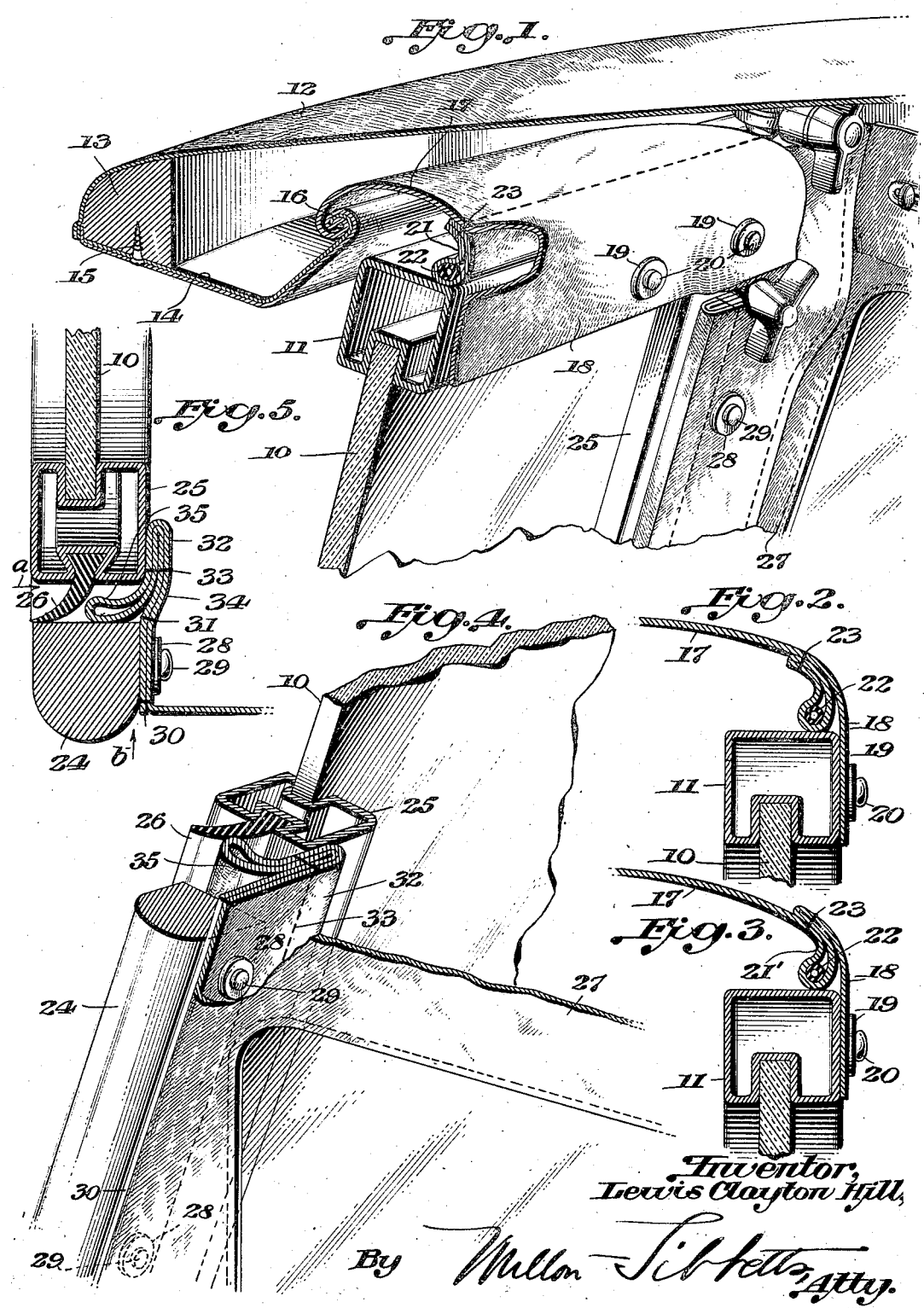

Patented Feb. 3, 1925.

1,524,710

UNITED STATES PATENT OFFICE.

LEWIS C. HILL, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed September 5, 1918. Serial No. 252,683.

*To all whom it may concern:*

Be it known that I, LEWIS C. HILL, a citizen of the United States, and resident of Detroit, Wayne County, State of Michigan, have invented certain new and useful Improvements in Motor Vehicles, of which the following is a specification.

This invention relates to motor vehicles, and more especially to storm curtains that are used in conjunction with a windshield and a top.

The usual storm equipment of a passenger vehicle having an open body comprises a windshield, collapsible top, and side curtains adapted to be coupled to the top and to the windshield by suitable fasteners. This equipment is not always satisfactory because wind, and sometimes dust, rain and snow enter the enclosure through the crevices between the top and windshield and between the windshield and side curtains, the crevices at the locations specified being at the front of the enclosure where the air pressure, due to traveling, tends to separate the elements from each other, and thereby increase the size of the crevices.

The present invention provides a curtain structure adapted to lie against the sash of the windshield in such manner that the joint between the curtain and the sash is tightened automatically by the external air pressure due to traveling. It follows, therefore, that as the air pressure increases with increases in speed the parts in question are pressed against each other with increasing pressure, thereby insuring substantially wind-proof and weather-proof joints between the storm curtains and the windshield.

The accompanying drawings illustrate the essential features of the present invention in what I now consider to be the preferred forms, although it will be apparent that further changes in the construction and arrangement of the cooperating parts may be made without departing from the fundamental principles involved. Referring to the drawings—

Figure 1 represents a perspective view, partly in vertical section, including the forward portion of a collapsible top, the upper portion of a windshield and a weather-proof curtain permanently anchored to the top and detachably connected to the sash of the windshield, said curtain embodying the self-tightening construction that is responsive to external air pressure.

Figure 2 represents a section in a vertical plane of the curtain construction included in Figure 1.

Figure 3 represents a view similar to Figure 2 showing an alternative construction embodying the same self-tightening principle.

Figure 4 represents a perspective view partly in horizontal section of an assemblage including a side stanchion that supports the windshield, a fragment of the windshield, and a side curtain the forward marginal portion of which serves to make a tight joint between the sash of the windshield and the side stanchion.

Figure 5 represents a horizontal section through the assemblage shown in Figure 4.

The same reference characters indicate the same parts wherever they occur.

The glass panel of the windshield is indicated at 10, and the top bar of the sash is indicated at 11. Figure 1 includes the front portion of a collapsible top, the outer fabric of the top being indicated at 12, and the front bow being indicated at 13. All the figures of drawing stand on the sheet as though the front of the vehicle were at the left, and the rear of the vehicle at the right. In Figure 1 the front portion of the top is shown as overhanging the windshield, and one of the objects of this invention is to prevent wind, dust, rain and snow from entering the enclosure by passing over the top of the windshield. For this purpose a curtain is permanently anchored to the under side of the top, and is arranged to be connected to the top of the windshield by a series of snap fasteners or other suitable coupling devices. When the top is collapsed and folded back at the rear of the vehicle the curtain remains with the front bow of the top, being then uncoupled from the windshield.

The coupling devices are spaced with regard to the stresses to be sustained, and with regard to expediting the operation of coupling the curtain to the windshield, and in order to prevent crevices being formed between said devices by external air pressure against the front of the vehicle the curtain is embodied in a structure that forms a continuous joint with the top bar of the windshield sash without regard to the spaces between the fasteners.

A flange 14 of sheet metal is fastened to the under side of the front bow 13 by a series of screws 15, said flange extending transversely of the vehicle. The rear marginal portion of the flange extends upwardly and is rolled over to form a channel portion 16, which serves as a permanent anchorage for a curtain 17. The free marginal portion 18 of the curtain is provided with fastener members 19, the latter being arranged in a series, at suitable intervals, extending transversely, and adapted to co-operate with fastener members 20 carried by the top bar 11 of the windshield sash. The curtain is provided with a weather-strip adapted to lie against the top bar 11 to prevent external air pressure from forming crevices between the curtain and the bar 11.

As shown by Figures 1 and 2 the weather-strip comprises a strip 21 of flexible sheet material, doubled upon itself to form a pocket, and a filler-strip 22 arranged in said pocket. The filler-strip is preferably circular in cross-section, and is shown as being made of rubber tubing. It is coextensive with the enclosing strip 21. The two marginal portions of the strip 21 are arranged one against the other and are attached by any suitable means, such as a course of stitches 23, to the curtain member 17 between the marginal portion 18 and the anchoring element 16.

When the top 12 and the windshield are in position for use marginal portion 18 of the curtain may be carried over the top of the windshield and connected to the top bar 11 by coupling the fastener members 19 and 20 to each other. The weather strip is so disposed as to bear upon the top surface of the windshield sash, a slight pressure upon the sash being caused by the weight of the curtain and weather-strip and by the tension required to couple the fastener members. The weather strip curls toward the front, and when there is any considerable external air pressure against it, whether caused by wind or by forward travel of the vehicle, such pressure tightens the weather-strip against the sash throughout the length of the bar 11, the weather-strip and bar 11 being coextensive. External elements are thus excluded so that they can not enter between the rear side of the bar 11 and the marginal portion of the curtain 17. The weather-strip and marginal portion 18, conjointly, form a valley adapted to receive the top bar of the windshield sash.

Figure 3 shows how the curtain 17 may be folded and stitched to form the weather-strip, instead of attaching a separate piece. The structure shown in this figure differs from that shown in Figures 1 and 2 in that the curtain 17 is folded back upon itself to form a pocket 21 to enclose the filler-strip 22, and is secured by a course of stitches 23.

In both the forms shown by Figures 2 and 3 the weather-strip is rolled or curled toward the front and held downwardly by the fasteners 19, 20, with the result that any uncurling tendency due to upward pressure of air against the curtain 17 would maintain a substantially wind-proof joint between the weather-strip and the bar 11.

Substantially the same principle of maintaining a wind-proof joint is embodied in the structure shown by Figures 4 and 5. Here again the windshield glass is indicated at 10. The windshield stanchion 24 is fixed to the vehicle at the sides of the cowl and supports the hinges (not shown) by which the upper and lower sashes of the windshield are usually mounted. The side bars of the upper sash are indicated at 25, 25, and in accordance with former practice they are provided with weather-strips 26 of rubber or similar soft material arranged to lie against the stanchions 24, excepting when the sash is tipped to an angle relatively to the stanchions. The forward sections of the side curtains are indicated at 27, 27. These sections are provided with fastener members 28 arranged to co-operate with fastener members 29 that project toward the rear from the rear face of the stanchions. The members 28 and 29 are socket and stud members respectively, like those indicated at 19 and 20. The forward marginal portion of the side curtain turns inwardly to be connected to the stanchion.

My improved curtain structure is adapted to prevent the entrance of wind between the windshield and the side curtains. The weather-strips 26 become broken and nicked, thereby leaving gaps between the stanchions and the sashes through which wind may blow. Furthermore the gaps between the strips 26 of the upper and lower sashes afford opportunities for wind to enter. In order to utilize the side curtains to exclude wind that may leak through at these points I extend the front marginal portion of each curtain a considerable distance beyond the line of attachment with the stanchion, and prepare the marginal portion in the manner now about to be described.

The side curtain is cut so that its front edge 30, before being folded back, will be five or six inches, more or less, beyond the line in which the socket members 28 are to be inserted. The front edge 30 of the fabric is then folded back a short distance behind the line of the fasteners 28 thus providing two layers of fabric to receive the fasteners. The fabric thus doubled is stiffened by a course of stitches 31, and is then doubled again to provide a wale 32 having four layers. These four layers are then stitched together by a course of stitches 33, the web 34 receiving additional stiffness in consequence thereof, and the original loop or fold 35 comprising two layers being left free.

The thick and comparatively stiff web 34 is thus made available to hold the wale 32 against the rear or inner surface of the sash bar 25, the more flexible flange 35 being left available and in position to be tucked into the space between the bar 25 and stanchion 24. The normal tendency of the wale 32 is to lie against the sash bar 25 with a slight pressure due to the holding effect of the fasteners 28, 29, while the normal tendency of the flange 35 is to lie against the inner surface of the stanchion 24, as shown by Figure 5, with a slight pressure due to the unbending tendency.

This structure performs its weather-excluding functions from the top of the upper sash to the bottom of the lower sash. Assuming that the sashes are in closed position as shown, a strong air pressure in the direction of the arrow $a$ would force the free marginal portion of the weather-strip against the inner face of the stanchion, but there would still be leakage between the strips of the upper sash and those of the lower sash, and also through any nicks or ruptured parts of the strips. All air that leaks past the strips 26 is stopped by the flange or flap 35 and wale 32, which, like the elements 18 and 21, form a valley in which the sash lies. The action of the flanges 21 and 35 is similar to the action of the flap of a check valve.

In case a wind blowing against the side of the vehicle as indicated by arrow $b$ should form crevices between the side curtain and the stanchion it would be excluded by the flange 35.

Having described my invention what I claim as new and desire to secure by Letters Patent is:

1. A device of the character described, including in combination, a windshield sash, a top overhanging said sash, and a closure for the space between the said top and the upper member of said sash including a flexible curtain anchored to said top and extending over said member and secured to the rear face thereof, a flexible flap forming a weather strip carried by said curtain and resting against the top surface of said member, said curtain being arranged to form a pocket above said member and opening downwardly, whereby air pressure therein forces said flap against said top surface.

2. The combination with a windshield, of a storm-curtain having a marginal portion and a flexible flap forming, conjointly, a valley to receive an edge of the windshield, said flap consisting of a strip of flexible sheet material having a loop or bend extending parallel to said valley, both longitudinal marginal portions of said flap being anchored to said curtain to leave said loop or bend free, the bight of said loop being arranged to be pressed against said windshield by external air-pressure and means to couple said curtain to the windshield otherwise than by said flap.

3. The combination with a windshield, of a storm-curtain having a marginal portion and flexible flap forming, conjointly, a valley to receive an edge of the wind-shield, said flap consisting of a strip of flexible sheet material having a loop or bend extending parallel to said valley, both longitudinal marginal portions of said flap being anchored to said curtain to leave said loop or bend free, the bight of said loop being arranged to be pressed against said windshield by external air-pressure, a filler-strip of soft material arranged in and extending longitudinally of said bight, and means to couple said curtain to the windshield otherwise than by said flap.

4. The combination with a windshield, and a side stanchion therefor, of a storm-curtain having a flange portion arranged to lap the stanchion and the windshield, means arranged to fasten said flange to the stanchion, and a weather-strip carried by said flange and arranged to project between the stanchion and the windshield.

5. The combination with a windshield, and a side stanchion therefor, of a storm-curtain having a relatively stiff flange portion arranged to lap the stanchion and the windshield, means arranged to fasten said flange to the stanchion, and a weather-strip carried by said flange and arranged to project between the stanchion and the windshield.

6. The combination with a windshield, and a side stanchion therefor, of a storm-curtain having a flange portion arranged to lap the stanchion and the windshield, means arranged to fasten said flange to the stanchion, and a compressible weather-strip carried by said flange and arranged to project between the edge of the stanchion and the windshield.

7. The combination with a windshield, and a side stanchion therefor, of a storm-curtain having a flange portion arranged to lie against the rear faces of the stanchion and windshield respectively, cooperative fasteners carried by said flange and the rear face of the stanchion respectively, and a flexible weather-strip carried by said flange and arranged to project between the windshield and the stanchion.

8. The combination with a windshield and a side stanchion therefor, of a storm curtain, having a flange portion arranged to lap said stanchion and windshield and means for securing said flange to said stanchion, said curtain being folded back upon itself to form a weather strip adapted to contact with the edge of said stanchion adjacent said windshield.

9. The combination with a windshield and a side stanchion therefor, of a storm curtain formed of a plurality of thicknesses of flexible material, said curtain having a flange portion arranged to lap said stanchion and windshield and said curtain being folded back on itself to form a weather strip adapted to contact with the edge of said stanchion adjacent said windshield.

In testimony whereof I affix my signature.

LEWIS C. HILL.